(12) United States Patent
Dultz et al.

(10) Patent No.: US 6,748,081 B1
(45) Date of Patent: Jun. 8, 2004

(54) QUANTUM CRYPTOGRAPHY SYSTEM FOR A SECURE TRANSMISSION OF RANDOM KEYS USING A POLARIZATION SETTING METHOD

(75) Inventors: Wolfgang Dultz, Frankfurt (DE); Heidrun Schmitzer, Regensburg (DE); Leonid Beresnev, Darmstadt (DE); Eric Hildebrandt, Frankfurt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/357,436

(22) Filed: Jul. 20, 1999

(30) Foreign Application Priority Data

Jul. 24, 1998 (DE) .......................................... 198 33 330

(51) Int. Cl.[7] ................................................ H04L 9/00
(52) U.S. Cl. .......................... 380/277; 380/9; 380/112; 380/157
(58) Field of Search ................................. 380/277, 112, 380/157, 9, 256; 359/229, 885; 398/184, 205

(56) References Cited

U.S. PATENT DOCUMENTS

| 5,757,912 A | * | 5/1998 | Blow .......................... 380/21 |
| 5,764,765 A | * | 6/1998 | Phoenix et al. ............... 380/21 |
| 5,768,378 A | * | 6/1998 | Townsend et al. ............ 380/21 |
| 5,953,421 A | * | 9/1999 | Townsend ..................... 380/21 |

FOREIGN PATENT DOCUMENTS

| DE | 196 24 769 | 1/1998 |
| WO | WO 88/06303 | 8/1988 |
| WO | WO 90/09614 | 8/1990 |
| WO | WO 96/07951 | 3/1996 |

OTHER PUBLICATIONS

Bethune, et al., IEEE Journal of Quantum Electronics, vol. 36 No. 3, Mar. 2000, pp. 340–347.*
G. Andersson et al., "Device physics of the soft-mode electro-optic effect", J. Appl. Phys. 66 (10), Nov. 15, 1989 pp. 4983–4995.
Townsend et al., "Design of quantum cryptography systems for passive optical networks", Electronics Letters, Oct. 27, 1994, vol. 30, No. 22, pp. 1875–1877.
Franson et al., "Operational system for quantum cryptography", Electronics Letters, Feb. 2, 1995, vol. 31, No. 3, pp. 232–234.
Seward et al., "Daylight demonstration of a low-light-level communication system using correlated photon pairs", Quantum Opt. 3 (1991) pp. 201–207.
Bennett, "Quantum Cryptography Using Any Two Nonorthogonal States", Phys Rev. Lett. vol. 68, No. 21, pp. 3121–3124.
Townsend et al., "A quantum key distribution channel based on optical fibre", Journal of Modern Optics, 1994, vol. 41, No. 12, 2425–2433.
Breguet et al., "Quantum cryptography with polarized photons in optical fibers", Journal of Modern Optics, 1994, vol. 41, No. 12, 2405–2412.

* cited by examiner

Primary Examiner—Kim Vu
Assistant Examiner—Chi-Chung Lee
(74) Attorney, Agent, or Firm—Kenyon & Kenyon

(57) ABSTRACT

A quantum cryptography system using electrooptical liquid crystal modulators which change the polarization and which are designed as electrically rotatable retardation plates whose two birefringent axes are rotated by the applied electrical field around an angle θ which depends on the strength of this field. A λ/2 retardation plate rotates the elliptically polarized light striking the plate around an angle 2θ at speeds in the microsecond range. The quantum cryptography system can be used for interception-proof data transmission over transmission links that are accessible to the public.

5 Claims, 3 Drawing Sheets

Poincaré - Sphere $S_1, S_2$ Fast Axes
$P_1, P_2$ Polarization State

QUANTUM CRYPTOGRAPHY SYSTEM FOR A SECURE TRANSMISSION OF RANDOM KEYS USING A POLARIZATION SETTING METHOD

BACKGROUND INFORMATION

Available quantum cryptography systems are referenced in Quantum Opt. -3 201 (1991), by S. F. Seward et al., Phys. Rev. Lett. 68 3121 (1992), by Ch. Bennet, Electronics Letters 30 1875 (1994), by P. D. Townsend et al., and Electronics Letters 31 232 (1995), by I. D. Franson et al.

Quantum cryptography is a method for a secure transmission of random keys, used to encrypt messages, over publicly accessible optical communication channels. Attempts to intercept the message disturb key generation by changing the exchanged quantum states of the light, with the result that the information encrypted by the key cannot be used. Attempts to intercept the message can be detected.

A message can be transmitted securely only if it generally cannot be intercepted or comprehended, even by the network operator himself. For this purpose, a random key of the same length as the message itself must be reliably exchanged between the transmitter and receiver. Quantum optical methods, which are described briefly below, have been suggested for this purpose.

The various physical properties of the quantum state of light cannot be measured precisely at the same time. This is felt the most strongly with polarization. Because the latter is composed of two independent directions of polarization, and the polarization analysis involves detecting a photon behind an analyzer (and thus destroying it), a single measurement can identify only one component of the polarization state at a time, while the others remain unidentified.

An eavesdropper must measure the photon he has intercepted and then replace it so that its absence is not detected. However, he cannot precisely identify the polarization state and therefore cannot obtain any precise information and also has no way to precisely duplicate the photon. The secure distribution of a statistical key between a transmitter and a receiver takes advantage of this fact. The transmitter and receiver can precisely receive the message since they subsequently exchange additional information about the base system in which the polarization is measured. This information is of no use to the eavesdropper.

A feature of conventional quantum cryptography methods is the ability to switch a polarizer at the transmitter's location and switch an analyzer at the receiver's location. Electrooptical modulators which either contain an electrooptical switch that transmits the light to individual, permanently set polarizers or analyzers on preset channels, as suggested in Mod. Optics 41 2405, by J. Breguet et al., or which are designed as switchable retarding elements as suggested in Mod. Optics 41 2425 (1994) written by P. Townsend et al. are used for this purpose.

FIG. 1 shows a principle of a conventional quantum cryptography device according to the polarization setting method. The transmitter has a single-photon source 2, such as a reduced-power laser, while the receiver has a detector for detecting individual photons 6, and both have a polarization setter, such as a linearly polarizing analyzer which can be rotated into positions x, x', y or y' (e.g., a polarizer 3, an analyzer 5, with a glass fiber 4 connecting).

The transmitter and receiver are connected by a quantum channel 1 in which individual photons are transmitted without any active amplification, as well as by a conventional line, such as a telephone or radio connection. Two random number generators independently adjust the analyzers at the transmitting and receiving ends each time an individual quantum state (photon) is transmitted.

An interferbmetric phase measurement for distributing the keys according to quantum cryptographic means can also be used instead of the polarization measurement, as suggested in Mod. Optics 41 2425 (1994), by P. Townsend et al. To do this, a defined optical path must be inserted into two interferometers at the transmitting and receiving ends. This can be done by adjusting a mirror or by electrooptical retardation in suitable materials, such as lithium niobate.

In available quantum cryptography systems according to the polarization setting method, which actually permit high speeds via the transmission channels, there are long switching times of the optical modulators used for this purpose.

SUMMARY OF THE INVENTION

An object of the present invention is to provide a faster quantum cryptography system according to the polarization setting method.

A quantum cryptography system according to the present invention uses electrooptical liquid crystal modulators which change the polarization and which are designed as electrically rotatable retardation plates whose two birefringent axes are rotated by the applied electrical field around an angle θ which depends on the strength of this field. Thus, a λ/2 retardation plate rotates the elliptically polarized light striking the plate around an angle 2θ at speeds in the microsecond range. The quantum cryptography system can be used for interception-proof data transmission over transmission links that are accessible to the public.

DETAILED DESCRIPTION

In exemplary embodiments and/or exemplary methods of the present invention, liquid crystal elements, designed as electrically rotatable half-wave plates, are proposed as the polarization setter and retardation elements for quantum cryptography. See, e.g., German Patent Application No. 196 24 769.1.

A λ/2 plate rotates linearly polarized light around an angle 2α when the light strikes the plate at angle a relative to the fast axis. There is no loss of light, as would be the case when using an analyzer. In addition, the method doubles the angle of rotation, reducing electrical consumption by fifty percent under some circumstances.

The new liquid crystal elements can achieve switching times of just a few microseconds or less.

Figure 2:
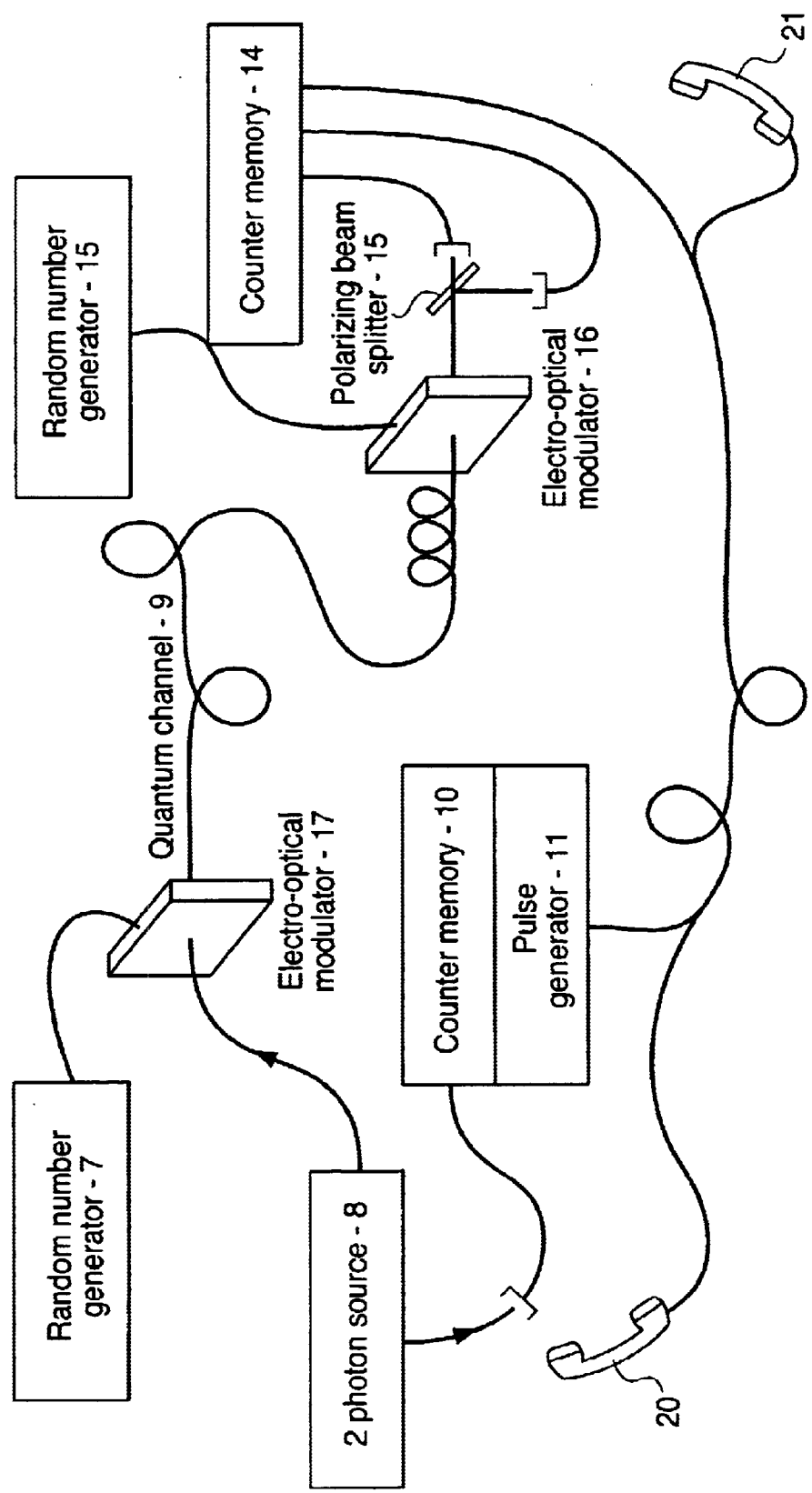
FIG. 2 shows a quantum cryptography system according to the present invention.

FIG. 2 shows a quantum cryptography system between a transmitter 20 and a receiver 21 according to the present invention.

The single-photon source 8 (associated with a counter memory 10 and pulse generator 11) is a nonlinear crystal or another nonlinear material in which the high-energy photon of a laser breaks down into two low-energy photons. To satisfy the equation of energy, this decay takes place so that both photons are created simultaneously, and one of them can be detected in the form of a trigger photon to verify the existence of the other. This second photon receives a fixed polarization and is used to generate the key.

Figure 1:
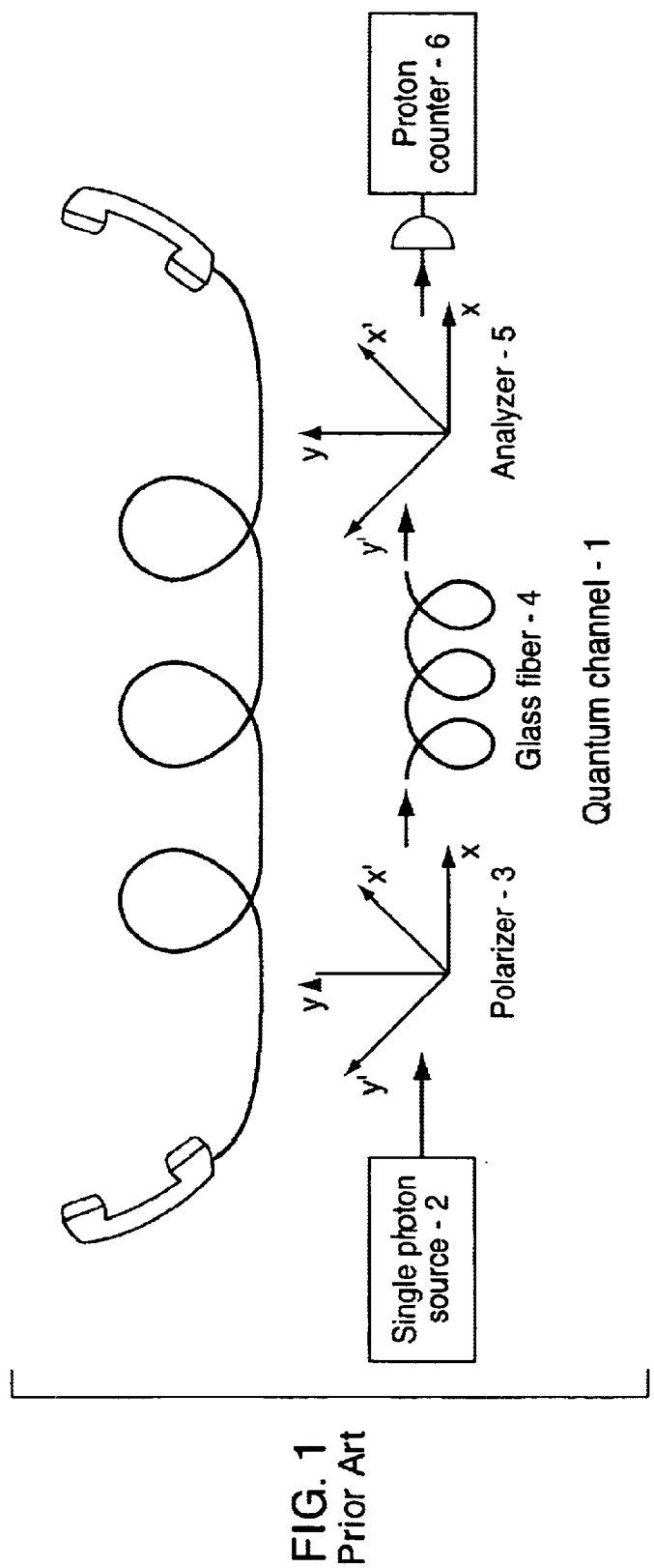
FIG. 1 shows a conventional quantum cryptography system.

The polarization of the photon is switched back and forth statistically between two optical base systems in the first electrooptical modulator 17, e.g. between x, x', y, y', as shown in FIG. 1, although other base systems can also be used.

The photon is then supplied to a highly transparent fiber link 9. This fiber link 9 is generally a standard fiber which modifies the polarization of the light as a function of time. Satellite transmissions, in which the photon passes freely through space, can also be used, preferably at the wavelengths of the Fraunhofer lines of the sun. The light is not amplified.

At the end of the fiber link (at the receiving end), the light is placed in a defined correlation with the transmitter by a polarization setter. This is achieved by feeding an intense light pulse of a single color and with a defined polarization to the fiber at the transmitting end approximately every 1/100 second for test purposes (a counter memory 14 may be arranged to assist). The polarization of this pulse is analyzed with the detectors described below at the receiving end, and the electrooptical modulator (EOM) 16, 17 at the receiving end (or transmitting end) is adjusted to obtain the correlation at the transmitting and receiving ends needed for quantum cryptography (notably, a random number generator 7, 15 may assist the electrooptical modulator 17, 16 respectively).

Because reorienting only the coordinate system of general elliptical polarization P at the end of the fiber is not enough to reset the polarization changes in the fiber, a second electrically adjustable $\lambda/4$ plate 13 must be inserted in addition to the electrically adjustable $\lambda/2$ plate described above. Other arrangements are also possible.

Figures 3A, 3B:
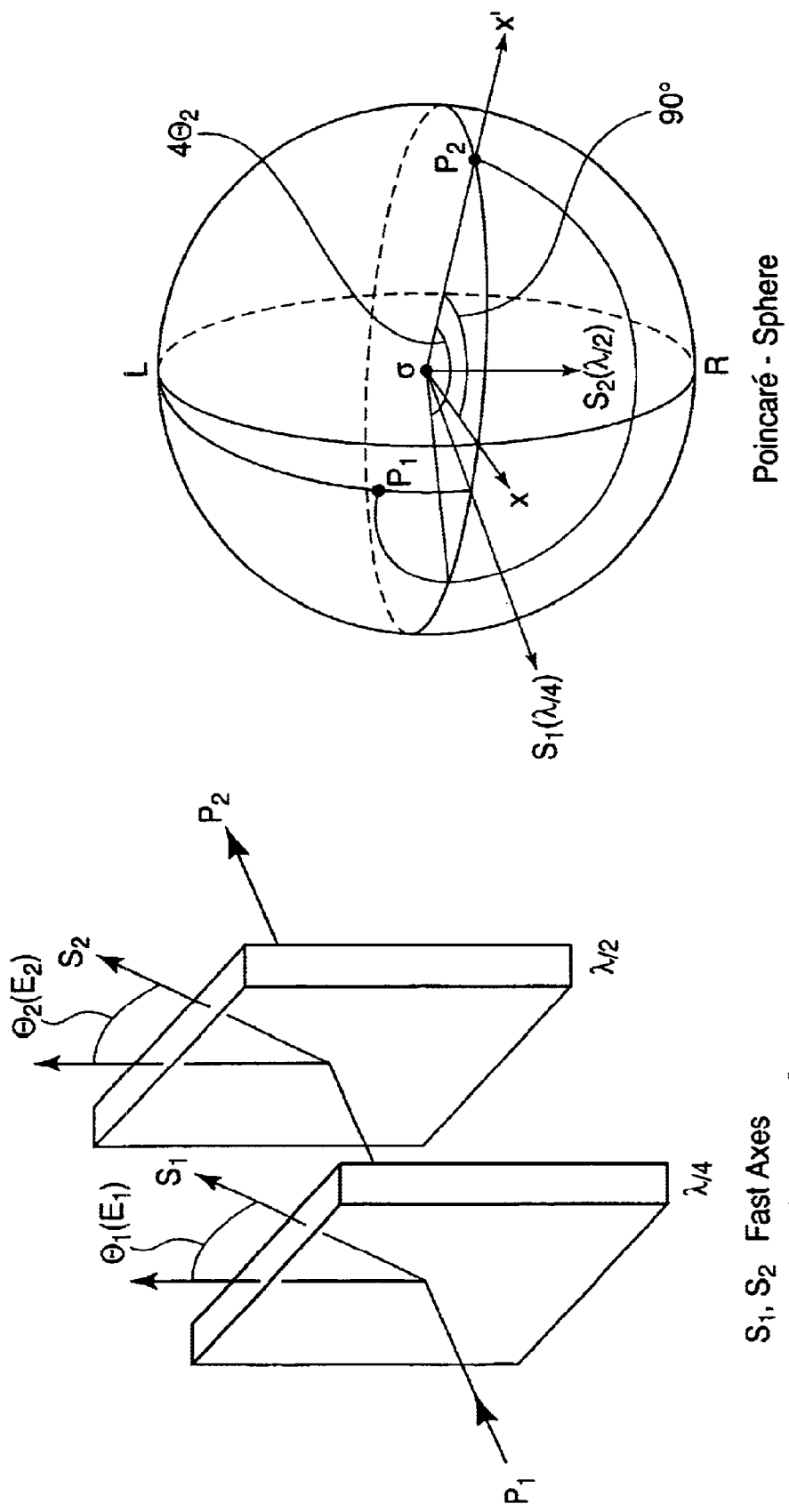
FIG. 3 shows a modulator with polarization changes plotted on a Poincare sphere.

FIGS. 3 a,b show the modulator and the corresponding polarization change on the Poincare sphere. The second electrooptical modulator shifts the base system on the equator of the Poincare sphere and is thus used both for equalizing the fiber birefringence and for quantum cryptography.

The optical path is split by a polarizing beam splitter 13 behind the modulator 16, and the two polarization components are measured with single-photon detectors, as shown in FIG. 2. The results are further processed in a computer. To reduce counting errors, the trigger photon in the transmitter generates a pulse which arrives at the receiver at the same time as the transmission photon, thus enabling coincidence counting to take place.

The necessary conventional channel over which the additional information is exchanged is designed, for example, as a conventional transmission channel at a different wavelength (WDM), but runs along the same quantum-transmitting glass fiber. Conventional methods can provide further protection against message interception.

With this type of transmission, the polarization setting in the quantum-transmitting fiber and the subsequent components can be advantageously checked from time to time through measurement and reset using electrooptical modulators or in conjunction with another retarding plate, such as a $\lambda/2$ plate (see FIG. 3). The polarization state of the light leaving the quantum fiber is measured with ellipsometric methods using an intense optical pulse which has the same spectral carrier frequency (wavelength) as the photon transmitting the key. To do this, the intense pulse is extracted by a beam splitter at the receiving end and analyzed.

If the pulse is not completely extracted, the photon detector at the receiving end must be protected against the intense pulse by a seal or similar means. With the help of the polarization setter illustrated in FIG. 3, the reset polarization state is subsequently rotated statistically to the x, y or x', y' base system.

What is claimed is:

1. A quantum cryptography system for a secure transmission of random keys utilizing a polarization setting method, comprising:

a quantum channel;

a transmitting arrangement generating statistical binary number sequences which change a polarization of individual photons, the transmitting arrangement transmitting the binary number sequences via the quantum channel;

a receiving arrangement analyzing the polarization and counting the individual photons; and electrooptical liquid crystal modulators changing the polarization, the liquid crystal modulators including electrically rotatable retardation plates having two birefringent axes which define an indicatrix, the birefringent axes being rotated by an applied electrical field around a first angle $\theta$ which depends on a strength of the applied electrical field, the electrically rotatable retardation plates being $\lambda/2$ retardation plates which rotate elliptically polarized light striking the $\lambda/2$ retardation plates around a second angle $2\theta$.

2. The quantum cryptography system according to claim 1, wherein the $\lambda/2$ retardation plates are consecutively arranged to generate larger angles of rotation so that fast axes of each of the $\lambda/2$ retardation plates are positioned at a third angle $\beta \leq 2\Omega$ at field zero, the third angle being less than or equal to two times a maximum angle $\Omega$ around which the indicatrix of the $\lambda/2$ retardation plates can be rotated by the applied electrical field.

3. The quantum cryptography system according to claim 1, wherein the quantum channel includes a glass fiber which does not have an intermediate amplifier, wherein a conventional channel is routed over the quantum channel at a different spectral carrier frequency.

4. The quantum cryptography system according to claim 1, wherein the electrooptical liquid crystal modulators check the polarization setting in a quantum-transmitting fiber of the quantum channel and in subsequent other components by a measurement procedure, and wherein the electrooptical liquid crystal modulators are capable of resetting the polarization setting in conjunction with a further retardation plate.

5. The quantum cryptography system according to claim 1, wherein the quantum channel includes free space for transmitting individual quantum states of light, and wherein disturbances of the light which are caused by sunlight are reduced using one of absorption lines of an outer atmosphere of sun during transmissions of the individual states of the light one of through the sun's outer atmosphere, to and from satellites, in space, and between the satellites in space.

\* \* \* \* \*